US009840335B2

(12) United States Patent
Becks et al.

(10) Patent No.: US 9,840,335 B2
(45) Date of Patent: Dec. 12, 2017

(54) FOOLPROOFING SYSTEM FOR PIPES BY MEANS OF AN OBSTACLE INSIDE A CONNECTOR IN AN AIRCRAFT DUCT

(71) Applicants: Airbus Operations (SAS), Toulouse (FR); Airbus Operations GmbH, Hamburg (DE); AIRBUS SAS, Blagnac (FR)

(72) Inventors: Ralf Becks, Buxtehude (DE); Alexis Courpet, Fronton (FR); Thomas Barre, Fregouville (FR); Olivier Bourbon, Aucamville (FR); Matthieu Biteau, Toulouse (FR); Jean-Marc Roques, Colomiers (FR); Christophe Buresi, Toulouse (FR); Brice Lenoir, Toulouse (FR); Philippe Villeroux, Leguevin (FR)

(73) Assignees: Airbus SAS, Blagnac (FR); Airbus Operations SAS, Toulouse (FR); Airbus Operations GmbH, Hamburg (DE)

( * ) Notice: Subject to any disclaimer, the term of this patent is extended or adjusted under 35 U.S.C. 154(b) by 184 days.

(21) Appl. No.: 14/976,407

(22) Filed: Dec. 21, 2015

(65) Prior Publication Data
US 2016/0176536 A1 Jun. 23, 2016

(30) Foreign Application Priority Data
Dec. 22, 2014 (FR) ..................................... 14 63146

(51) Int. Cl.
B64D 37/32 (2006.01)
B64D 37/00 (2006.01)
(Continued)

(52) U.S. Cl.
CPC ........... *B64D 37/32* (2013.01); *B64D 37/005* (2013.01); *B64F 5/10* (2017.01); *F16L 9/19* (2013.01); *F16L 27/0804* (2013.01); *F16L 27/12* (2013.01)

(58) Field of Classification Search
CPC ...... B64C 3/187; B64D 37/005; B64D 37/32; B64F 5/10; F16L 9/21; F16L 27/0804; F16L 27/12
See application file for complete search history.

(56) References Cited

U.S. PATENT DOCUMENTS 1,996,281 A * 4/1935 Dolan .................... B64D 27/06
                                                                                123/51 A
2,681,778 A * 6/1954 Hughes .................. B64D 37/10
                                                                                244/135 R
(Continued)

FOREIGN PATENT DOCUMENTS

| EP | 0082950 | 7/1983 |
| EP | 2728231 | 5/2014 |

OTHER PUBLICATIONS

French Search Report, dated Oct. 30, 2015.

Primary Examiner — Justin M Benedik
(74) Attorney, Agent, or Firm — Greer, Burns & Crain Ltd.

(57) ABSTRACT

In an aircraft duct formed with pipes connected in pairs via connectors in which the pipes are mounted with the possibility of axial displacement, there exists a risk that a pipe of the duct, with a dimension greater that the dimension of the nominal pipe, is mounted instead and in place of the latter. In this case, the wrongly mounted pipe would risk not having sufficient clearance in axial translation. In order to solve this problem, it is disclosed to equip one of the relevant connectors with an obstacle limiting the travel of the nominal pipe and preventing the mounting of a pipe with a greater (Continued)

dimension belonging to the duct. A method for assembling an aircraft portion is also proposed, in order to benefit from the particularities of the duct.

10 Claims, 3 Drawing Sheets

(51) Int. Cl.
*F16L 27/08* (2006.01)
*F16L 9/19* (2006.01)
*F16L 27/12* (2006.01)
*B64F 5/10* (2017.01)

(56) References Cited

U.S. PATENT DOCUMENTS

| | | | | |
|---|---|---|---|---|
| 2,745,613 A * | 5/1956 | Oswald | ............... | B64C 17/00 244/203 |
| 3,093,350 A * | 6/1963 | Wilkins | ............... | B64C 3/50 244/203 |
| 4,330,100 A * | 5/1982 | Elber | ............... | B64C 3/52 244/48 |
| 4,624,425 A * | 11/1986 | Austin | ............... | B64C 1/061 244/118.1 |
| 6,547,589 B2 * | 4/2003 | Magyar | ............... | H02G 3/121 439/535 |
| 6,736,354 B2 * | 5/2004 | Goto | ............... | B64D 37/08 137/572 |
| 6,802,479 B2 * | 10/2004 | Howe | ............... | B64D 37/00 244/129.1 |
| 6,889,940 B1 * | 5/2005 | Howe | ............... | B64D 37/04 244/135 R |
| 6,997,415 B2 * | 2/2006 | Wozniak | ............... | B64D 37/00 244/135 C |
| 7,073,751 B1 * | 7/2006 | Tighe | ............... | B64C 17/10 244/135 C |
| 2002/0158464 A1 * | 10/2002 | Cummins | ............... | F16L 27/12 285/93 |
| 2003/0218098 A1 * | 11/2003 | Goto | ............... | B64D 37/08 244/135 R |
| 2005/0044712 A1 * | 3/2005 | Gideon | ............... | B60R 13/02 29/897.32 |
| 2009/0025815 A1 * | 1/2009 | Becks | ............... | F16L 9/18 138/112 |
| 2010/0314866 A1 * | 12/2010 | Volchko | ............... | F16L 5/00 285/194 |
| 2011/0147523 A1 * | 6/2011 | West | ............... | B64D 37/005 244/123.1 |
| 2014/0117162 A1 * | 5/2014 | Courpet | ............... | B64C 1/12 244/132 |

* cited by examiner

FOOLPROOFING SYSTEM FOR PIPES BY MEANS OF AN OBSTACLE INSIDE A CONNECTOR IN AN AIRCRAFT DUCT

CROSS-REFERENCES TO RELATED APPLICATIONS

This application claims the benefit of the French patent application No. 1463146 filed on Dec. 22, 2014, the entire disclosures of which are incorporated herein by way of reference.

BACKGROUND OF THE INVENTION

The present invention relates to the field of aircraft and more particularly concerns an aircraft portion including a structure and a duct intended for the circulation of a fluid, such as oil or fuel, and comprising a plurality of pipes and a plurality of connectors fixed to the structure and connecting the pipes two-by-two.

In aircraft, some ducts are formed of pipes connected two-by-two by connectors fixed to the structure of the aircraft so that the pipes can move in translation over a limited travel to make it possible to absorb defects in the positioning of the connectors resulting from the manufacturing tolerances of the pipes and the tolerances for the positioning of the connectors relative to the structure, and also to make it possible to withstand differential deformations of the duct and of the structure in service.

These pipes, which are preferably of the double-wall type, have opposite ends inserted in annular cavities of the connectors so as to seal the connection between the pipes and the connectors, at the same time as allowing play in translation of the pipes.

Moreover, the complex geometry of the ducts generally requires the use of pipes of different lengths.

The result of this is a risk of a pipe that is too large being mounted instead of the nominal pipe, notably if the intended play of the nominal pipe is relatively large.

Now, such a mounting error can lead to damage to the pipe that has been mounted incorrectly given that the effective play of the latter may be less than the nominal play necessary to take into account defects of positioning and differential deformations as referred to above.

SUMMARY OF THE INVENTION

An object of the invention is notably to provide a simple, economic and effective solution making it possible to solve this problem at least in part.

To this end the invention proposes an aircraft portion, comprising a structure, and a duct intended for the circulation of a fluid and comprising a plurality of pipes, and a plurality of connectors fixed to the structure and connecting the pipes two-by-two.

The plurality of pipes includes pipes of different lengths, each having a first end situated on a first side of the duct and a second end and a first abutment situated on a second side of the duct.

Moreover, each connector includes a connector internal passage that fluidically connects two pipe internal passages respectively belonging to the two pipes that the connector connects to each other.

Also, each connector includes two cavities surrounding the connector internal passage and in which are respectively inserted respective ends of two consecutive pipes, namely a first cavity, preferably of annular shape, situated on the second side of the duct and a second cavity, preferably of annular shape, situated on the first side of the duct. The first and second cavities of each connector having respective axes.

The first and second cavities of each connector are delimited internally by respective radially internal walls of annular shape respectively centered on the respective axes of the first and second cavities and are delimited externally by respective radially external walls also of annular shape and respectively centered on the respective axes of the first and second cavities.

Each connector includes an internal support delimiting the first and second cavities of the connector and connecting the respective radially internal walls to the respective radially external walls of the first and second cavities.

Also, each pipe is movable in axial translation relative to the two connectors that the pipe connects to each other.

Moreover, each connector includes a second abutment that limits the travel in translation of the pipe received in the first cavity of the connector in the direction of the first side of the duct by cooperating with the first end of the pipe and a third abutment that limits the travel in translation of the pipe received in the second cavity of the connector in the direction of the second side of the duct by cooperating with the first abutment of the pipe.

Also, the plurality of connectors comprises at least a first connector and a second connector having the following features:

the respective internal supports of the first and second connectors have the same conformation;

the first cavity of the first connector and the second cavity of the second connector respectively receive the first and second ends of a first pipe of the plurality of pipes;

the first end and the first abutment of the first pipe are separated from each other by a first distance;

the internal support of the first connector and the third abutment that is part of the second connector are separated from each other by a second distance measured parallel to the respective axes of the first cavity of the first connector and the second cavity of the second connector; and the first connector and the second connector are positioned so that the plurality of pipes comprises a second pipe the first end and the first abutment of which are separated from each other by a third distance strictly greater than the first distance and strictly less than the second distance.

In other words, the second pipe could be mounted between the first and second connectors instead of the first pipe if these two connectors were of a conventional type. Now, the second pipe would not offer sufficient play in translation to absorb the positioning defects and the differential deformations in service referred to above, because the distance separating the first end and the first abutment of the second pipe is greater than the distance separating the first end and the first abutment of the first pipe.

In accordance with the invention the first connector includes a first obstacle arranged in the first cavity of this first connector, the first obstacle forming the second abutment and being separated from the third abutment of the second connector by a fourth distance less than or equal to the third distance and measured parallel to the respective axes of the first cavity of the first connector and the second cavity of the second connector.

Moreover, the second abutment of the second connector is formed by the internal support of the second connector or by a second obstacle arranged so that the relative position of the second obstacle and the internal support of the second connector is different from the relative position of the first obstacle and the internal support of the first connector.

Thus the obstacle makes it possible to prevent mounting the second pipe between the first connector and the second connector.

The obstacle may nevertheless be sufficiently far away from the third abutment of the second connector to allow movement in translation of the first pipe with sufficient play to absorb positioning defects and differential deformations in service.

The invention therefore makes it possible to prevent the use of a pipe larger than the nominal pipe between two consecutive connectors where there is a risk of confusion.

Moreover, the invention enables the use of connectors having an external configuration similar to the connectors of known type and therefore not necessitating modification of the structure of the aircraft portion.

The obstacle may moreover be added to a pre-existing conventional connector, for example by means of welding techniques or additive fabrication techniques.

The invention is particularly advantageous when the risk of a mounting error is aggravated by the presence of seals in the connectors, imposing frequent cycles of demounting and remounting the duct in order to verify the state of the seals.

Any pipe of the duct the first end and the first abutment of which are separated from each other by a fifth distance strictly greater than the first distance is preferably such that the fifth distance is greater than or equal to the fourth distance.

The foolproofing relating to the pipe to be mounted between the first connector and the second connector is therefore valid in respect of any pipe of the duct.

Moreover, the first obstacle is advantageously perforated.

Also, the internal support of each connector is preferably perforated.

Additionally, the first obstacle may be distanced from the internal support of the first connector.

The distance between the first obstacle and the internal support notably makes it possible to reduce the mass of the first obstacle and therefore of the connector.

The aircraft portion may notably be a fuselage section or a set of fuselage sections.

Alternatively, the aircraft portion may be a wing or a rear tail assembly.

The invention also concerns an aircraft including an aircraft portion of the type described above.

The invention also concerns a method for assembling an aircraft portion of the type described above, comprising:

a step comprising procuring the plurality of pipes and the plurality of connectors;

an assembly step comprising fixing the connectors to the structure of the aircraft portion and connecting the connectors two-by-two by means of the pipes; and a verification step comprising attempting to move each pipe in axial translation after the connection of the pipe to the corresponding two connectors and, if such movement in axial translation proves impossible, replacing the initial pipe with another pipe the first end and the first abutment of which are closer to each other than the first end and the first abutment of the initial pipe.

The method therefore makes it possible, at least where the first and second connectors referred to above are concerned, to guarantee that a pipe of larger size than the nominal pipe is not mounted between these two connectors.

The verification step preferably further comprises replacing the initial pipe by another pipe the first end and the first abutment of which are farther apart from each other than the first end and the first abutment of the initial pipe if the movement in axial translation of the initial pipe enables this initial pipe to separate from one of the corresponding two connectors.

BRIEF DESCRIPTION OF THE DRAWINGS

The invention will be understood better and other details, advantages and features thereof will become apparent on reading the following description given by way of nonlimiting example and with reference to the appended drawings, in which.

In all these figures, identical references may designate identical or similar elements.

Moreover, the various elements shown in these figures are intentionally not to scale in order to improve the clarity of the figures.

DETAILED DESCRIPTION OF THE PREFERRED EMBODIMENTS

Figure 1:
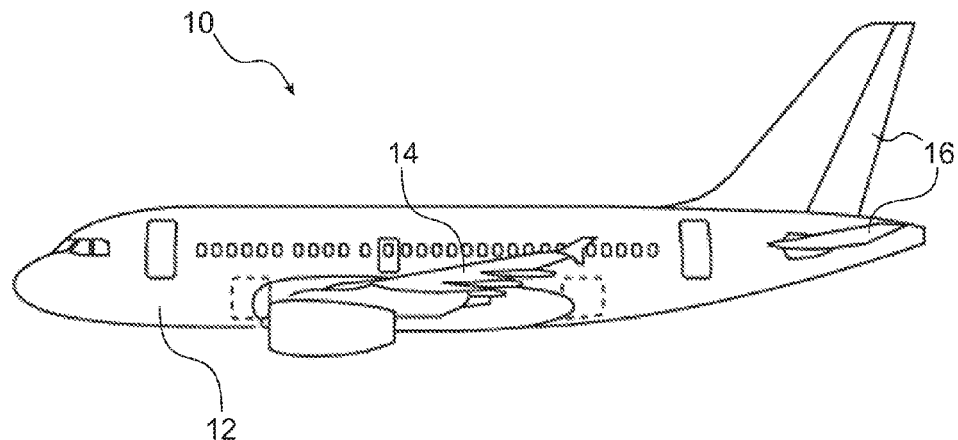
FIG. 1 is a diagrammatic side view of an aircraft in accordance with a preferred embodiment of the invention.
Figure 2:
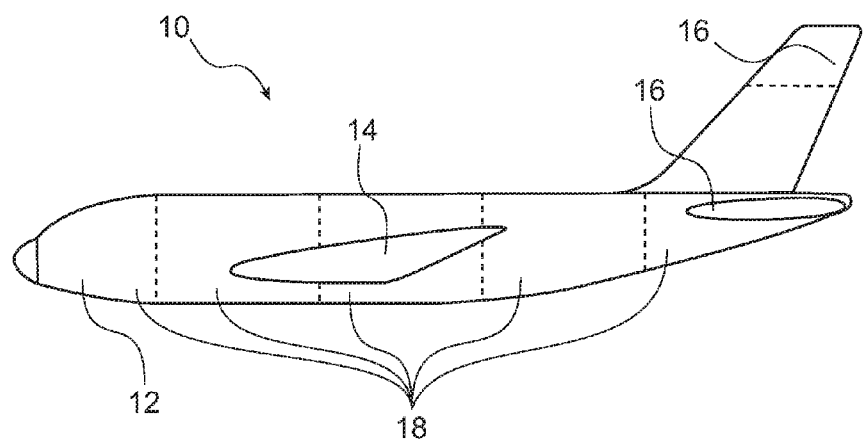
FIG. 2 is a view similar to FIG. 1 showing the division into sections of the fuselage of the aircraft from FIG. 1.

FIG. 1 is a general view of an aircraft 10 comprising a fuselage 12, wings 14, and a rear tail assembly 16. The fuselage 12 is for example formed of an assembly of fuselage sections 18 as FIG. 2 shows.

Figure 3:
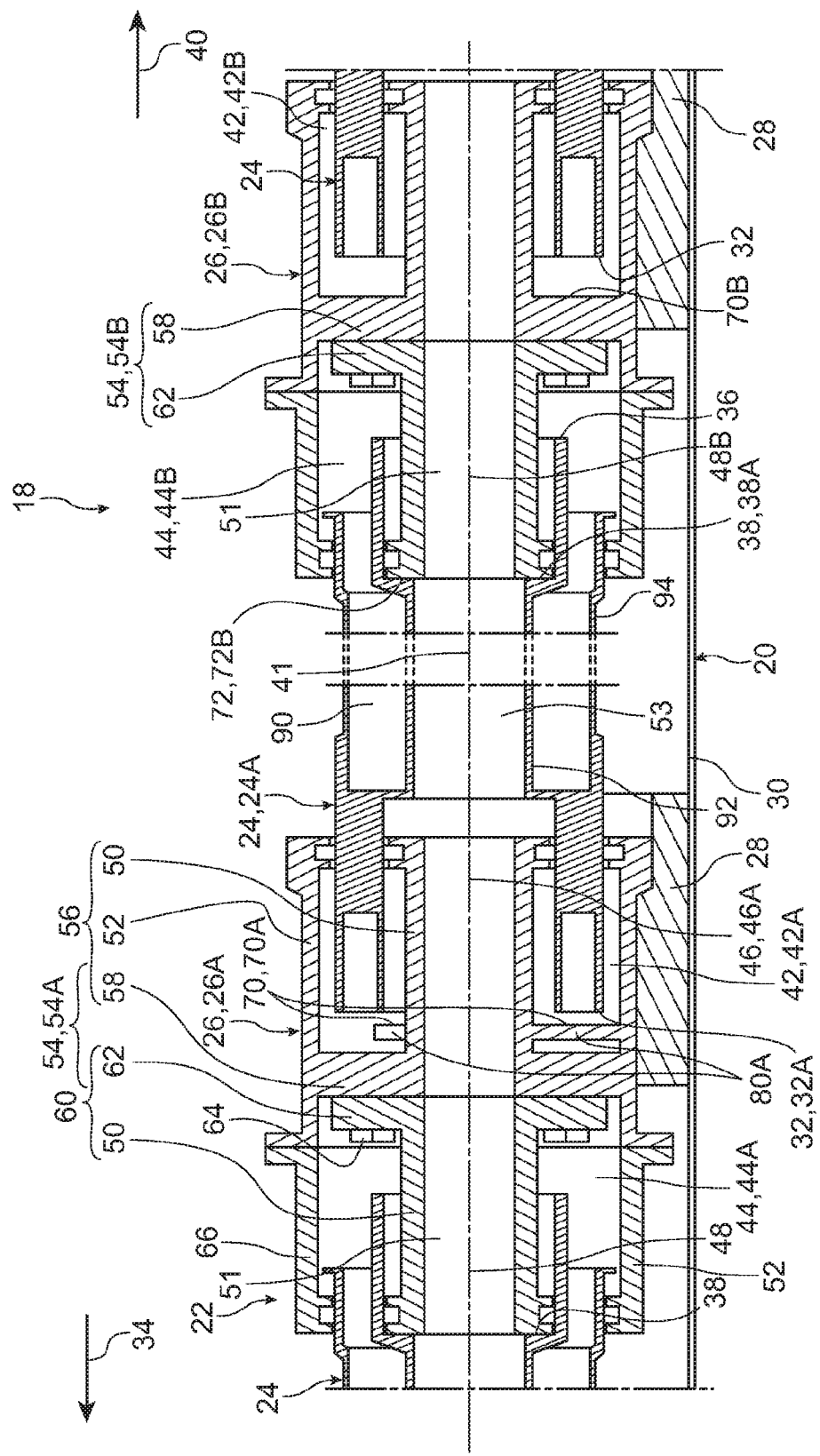
FIG. 3 is a diagrammatic view in axial section of a portion of the aircraft from FIG. 1 showing a duct and a structure of this aircraft portion.

A portion of the aircraft 10, for example one of the sections 18 or a set comprising a plurality of these sections 18, includes a structure 20 and a duct 22, a portion of which is shown in FIG. 3. Alternatively, the aircraft portion may be a wing 14 or a portion of the rear tail assembly 16.

The duct 22 is intended for the circulation of a fluid such as fuel, oil or any other type of fluid, in particular an inflammable fluid.

The duct 22 comprises a plurality of pipes 24 and a plurality of connectors 26 fixed to the structure 20 and connecting the pipes 24 two-by-two. FIG. 3 shows in particular two consecutive connectors and three consecutive pipes. Where the two end pipes are concerned, only one end of each of these pipes can be seen in FIG. 3. Where the middle pipe is concerned, a middle portion of the latter pipe is masked to reduce the size of FIG. 3.

The structure 20 comprises, for example, circumferential frames 28 connected to one another by fuselage panels 30. In the example shown, the connectors 26 are fixed to the circumferential frames 28.

The plurality of pipes 24 includes pipes of different lengths.

Each of the pipes 24 has a first end 32 situated on a first side of the duct (symbolized by the arrow 34 in FIG. 3) and a second end 36 and a first abutment 38 situated on a second side of the duct (symbolized by the arrow 40).

The first side 34 corresponds for example to an upstream side and the second side 40 to a downstream side of the duct, relative to the flow of the fluid in this duct in service, or vice versa.

The pipes 24 have a shape such that the two ends of each pipe have a common axis or respective parallel axes so as to allow movement of the pipe in translation, as will become more clearly apparent hereinafter. In this regard, the pipes 24 are preferably straight pipes, each therefore having a longitudinal axis 41.

Each connector 26 includes two cavities into which are respectively inserted respective ends 32, 36 of two consecutive pipes 24, namely a first cavity 42 of annular shape situated on the second side 40 of the duct and a second cavity 44 of annular shape situated on the first side 34 of the duct.

The first and second cavities 42, 44 of each connector 26 have respective axes 46, 48 that may coincide or not, depending on whether the connector 26 is straight or angled. The plurality of connectors may include angled connectors so as to confer a complex conformation on the duct 22.

The cavities 42, 44 of each connector 26 are delimited internally by respective radially internal walls 50 of the connector 26. These radially internal walls 50 are of annular shape and are respectively centered on the respective axes 46, 48 of the two cavities.

Moreover, the cavities 42, 44 of each connector 26 are delimited externally by respective radially external walls 52, also of annular shape and respectively centered on the respective axes 46, 48 of the two cavities.

The radially internal walls 50 of each connector 26 delimit externally a connector internal passage 51 that communicates with a pipe internal passage 53 of each of the two pipes 24 connected to the connector so as to allow the circulation of the fluid between these pipes.

Each connector 26 further includes an internal support 54 delimiting the first and second cavities 42, 44 of the connector and connecting the respective radially internal walls 50 to the respective radially external walls 52 of the cavities 42, 44.

It must therefore be understood that, by definition, each cavity 42, 44 extends axially as far as the internal support 54. In other words, the internal support 54 extends between the two cavities 42 and 44 of the connector.

In the example shown, each connector 26 is formed of a plurality of parts assembled to one another, notably:
a first part 56 comprising the radially internal walls 50 and the radially external walls 52 of the first cavity 42 and a first portion 58 of the internal support 54;
a second part 60 comprising the radially internal wall 50 of the second cavity 44 and a second portion 62 of the internal support 54 forming a flange fixed to the first portion 58 of this internal support, for example by means of fixing screws 64;
a third part 66 comprising the radially external wall 52 of the second cavity 44, fixed to the first part 56, for example by means of bolts (not visible in FIG. 3).

This configuration of the connectors 26 notably makes it possible to facilitate the assembly and the disassembly of the duct 22.

Of course, the connectors 26 may instead be produced in one piece or be formed of an assembly of parts different from that shown by way of example.

In the example shown, the internal support 54 of each connector 26 includes perforations (not visible in the figures) that establish fluidic communication between the two cavities 42, 44 of the connector. Alternatively, without departing from the scope of the invention, this internal support 54 may form a solid wall separating the two cavities 42, 44 from each other in a sealed manner.

Moreover, each pipe 24 is mobile in axial translation relative to the two connectors 26 that the pipe connects to each other. By "axial translation" must be understood a movement parallel to the respective axes 46, 48 of the two cavities in which the ends 32, 36 of the pipe are respectively inserted.

Each connector 26 includes a second abutment 70 that limits the travel in translation of the pipe 24 received in the first cavity 42 of the connector in the direction of the first side 34 of the duct by cooperating with the first end 32 of the pipe. Moreover, each connector 26 includes a third abutment 72 that limits the travel in translation of the pipe 24 received in the second cavity 44 of the connector in the direction of the second side 40 of the duct by cooperating with the first abutment 38 of the pipe.

Figure 4:
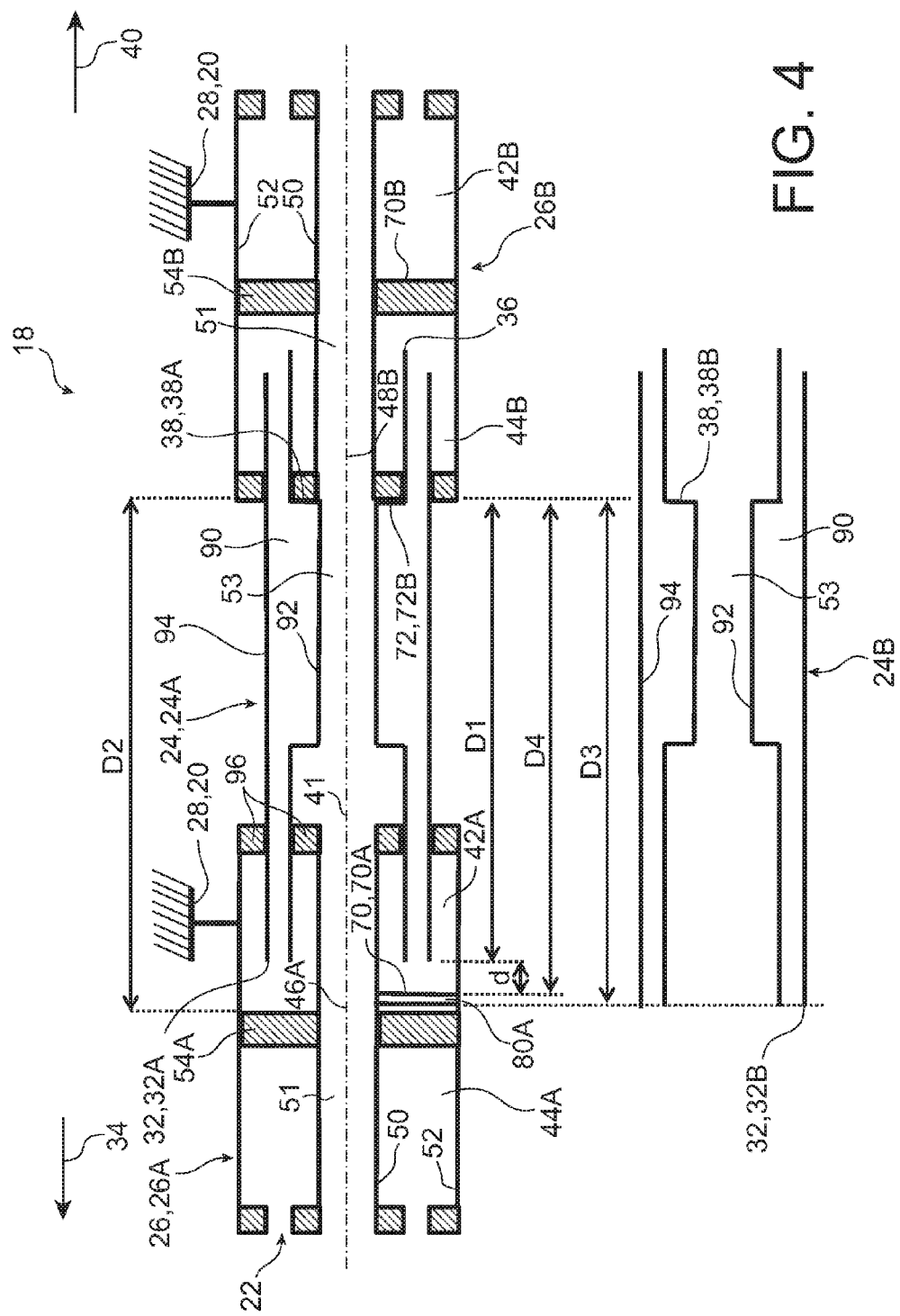
FIG. 4 is a diagrammatic view in axial section showing the aircraft portion from FIG. 3.

Moreover, the plurality of connectors 26 comprises at least a first connector 26A and a second connector 26B having the following particular features and shown in FIG. 4:
the respective internal supports 54A, 54B of the first and second connectors have the same conformation;
the first cavity 42A of the first connector 26A and the second cavity 44B of the second connector 26B respectively receive the first and second ends 32, 36 of a first pipe 24A;
the first end 32A and the first abutment 38A of the first pipe are separated from each other by a first distance D1;
the first pipe 24A is able to move in translation parallel to the axis 46A of the first cavity 42A of the first connector 26A and the axis 48B of the second cavity 44B of the second connector 26B so that the travel of the first pipe 24A is limited in the direction of the first side 34 of the duct by the first end 32A of the first pipe 24A coming into abutment against the second abutment 70A that is part of the first connector 26A and in the direction of the second side 40 by the first abutment 38A of the first pipe 24A coming into abutment against the third abutment 72B that is part of the second connector 26B;
the internal support 54A of the first connector 26A and the third abutment 72B are separated from each other by a second distance D2 measured parallel to the axes 46A, 48B;
the first connector 26A and the second connector 26B are positioned so that the plurality of pipes comprises a second pipe 24B (shown diagrammatically in FIG. 4 facing the first pipe 24A for illustrative purposes) conformed so that the first end 32B and the first abutment 38B of the second pipe 24B are separated from each other by a third distance D3 strictly greater than the first distance D1 and strictly less than the second distance D2.

In other words, the second pipe 24B of the duct 22 could be mounted between the two connectors 26A and 26B instead of the first pipe 24A (which constitutes the nominal pipe) if these two connectors 26A and 26B were of a conventional type. Now, the pipe 24B would not offer sufficient play in translation to absorb the positioning defects and the differential deformations in service referred to above.

To solve this problem the first connector 26A includes a first obstacle 80A inside the first cavity 42A of this first connector. This first obstacle 80A defines the second abutment 70A at a distance from the third abutment 72B, referred to as the fourth distance D4, that is less than or equal to the third distance D3. The fourth distance D4 is of course also measured parallel to the axes 46A, 48B. For example, the second abutment 70A comprises the face of the first obstacle 80A situated on the same side as the opening of the first cavity 42A.

The obstacle 80A therefore makes it possible to prevent mounting the second pipe 24B between the first connector 26A and the second connector 26B.

The obstacle 80A is nevertheless sufficiently far away from the third abutment 72B to allow sufficient play in translation d of the first pipe 24A. This play d corresponds to the difference between the fourth distance D4 and the first distance D1.

As a general rule, only connectors 26 for which there would exist a risk of confusion between the nominal pipe and another pipe of the duct if these connectors were of a conventional type are equipped with an obstacle like the obstacle 80A.

In particular, the first cavity 42B of the second connector 26B does not include any such obstacle. In other words, the second abutment 70B of the second connector 26B is formed by the internal support 54B of that connector. It is therefore this internal support 54B that limits the travel in translation of a pipe mounted in the first cavity 42B of the second connector 26B.

Alternatively, the second abutment 70B of the second connector 26B may be formed by a second obstacle such that the relative position of this second obstacle and the internal support 54B of the second connector 26B differs from the relative position of the first obstacle 80A and the internal support 54A of the first connector 26A. The second obstacle is therefore suited to a foolproofing situation other than the foolproofing situation concerning the choice of the pipe to connect the first connector 26A to the second connector 26B.

In accordance with a preferred feature, any pipe of the duct 22, the first end 32 and the first abutment 38 of which are separated from each other by a fifth distance strictly greater than the first distance D1, is such that the fifth distance is greater than or equal to the fourth distance D4.

The obstacle 80A therefore makes it possible to guarantee that only the first pipe 24A (constituting the nominal pipe) can be mounted between the connectors 26A and 26B.

Of course, it is preferable for any pair of consecutive connectors 26 of the duct 22 for which such a risk of confusion exists to conform to the principle explained above with reference to the two connectors 26A and 26B.

To summarize, in the preferred embodiment of the invention, in each connector equipped with an obstacle, that obstacle is positioned as a function of the dimensions of the pipes concerned, i.e., as a function on the one hand of the distance between the first end and the first abutment of the nominal pipe and as a function on the other hand of the distance between the first end and the first abutment of the pipe or pipes liable to be used by mistake, so that the nominal pipe may retain sufficient play but it is impossible to mount with play any pipe of the duct 22 having a size greater than that of the nominal pipe.

Moreover, the first obstacle 80A is preferably perforated. The perforations make it possible to reduce the mass of the first obstacle 80A. These perforations additionally make it possible, if the internal support 54A is itself perforated, to provide fluidic communication between the second cavity 44A and the portion of the first cavity 42A situated on the same side as the opening of that first cavity 42A, i.e. situated on the second side 40 of the duct 22.

The obstacle 80A is for example formed of three arms regularly distributed around the axis 46A and extending radially so as to connect the radially internal wall 50 of the first cavity 42A to the radially external wall 52 of that cavity. Only two of these arms can be seen in the FIG. 3 sectional view while only one of the arms can be seen in the FIG. 4 sectional view.

If the difference between the second distance D2 and the third distance D3 is sufficiently large, it may be advantageous for the first obstacle 80A to be distanced from the internal support 54A of the first connector, as in the example shown in FIGS. 3 and 4. This notably makes it possible to reduce the mass of the connector 26A.

Alternatively, and notably if the difference between the second distance D2 and the third distance D3 is relatively small, the first obstacle 80A may be contiguous with the internal support 54A. In this case the first obstacle 80A appears as an extension of the internal support 54A.

The principle proposed by the invention is particularly advantageous in the case of a duct including double-wall pipes. Pipes of this type are generally used to minimize the risk of leaks, in particular when the fluid circulating in the duct is inflammable.

Accordingly, in the example shown in FIGS. 3 and 4, the pipes 24 are of the double-wall type. These pipes therefore each include an annular passage 90 around the internal passage 53 of the pipe. These two passages are separated from each other by an annular internal wall 92 of the pipe while the annular passage 90 is delimited externally by an annular external wall 94 of the pipe. Accordingly, in the event of damage to the annular internal wall 92 of the pipe, the annular external wall 94 continues to confine the fluid circulating in the duct 22.

Each of the cavities 42, 44 of each connector 26 is in fluidic communication with the annular passage 90 of the corresponding pipe.

The radially internal wall 50 and the radially external wall 52 delimiting each cavity 42, 44 include at their respective ends, which delimit the opening of the cavity, seals 96 that provide a sealed contact with the annular internal wall 92 and the annular external wall 94 of the corresponding pipe 24, respectively.

It is to be noted that in the example shown in the figures the first abutment 38 of each pipe 24 is offset relative to the second end 36 of the pipe and the third abutment 72 of each connector 26 is arranged in the plane of the opening of the second cavity 44 of the connector.

Of course, other configurations of the first and third abutments 38, 72 are possible without departing from the scope of the invention.

In particular, the third abutment 72 of each connector 26 may be formed by the internal support 54 of the connector, in which case the first abutment 38 of each pipe 24 is formed by the second end 36 of the pipe.

Moreover, the pipe 24A being a straight pipe, the respective axes 46A and 48B of the first cavity 42A of the first connector 26A and second cavity 44B of the second connector 26B coincide.

Alternatively, the pipe 24A may have a transverse offset between its ends 32 and 36, in which case the respective axes 46A and 48B of the first cavity 42A of the first connector 26A and the second cavity 44B of the second connector 26B are offset relative to each other but are nevertheless parallel to each other.

Moreover, the connectors 26A and 26B described by way of example are straight connectors, i.e. connectors the two cavities 42 and 44 of which have respective axes 46, 48 that coincide.

Alternatively, at least one of the connectors 26A and 26B may be an angled connector, i.e. a connector the two cavities 42 and 44 of which have respective axes 46, 48 that are inclined relative to each other.

The duct 22 and the structure 20 may be assembled by means of a method comprising:

a step comprising procuring the plurality of pipes 24 and the plurality of connectors 26;

an assembly step comprising fixing the connectors 26 to the structure 20 and connecting the connectors 26 two-by-two by means of the pipes 24; and a verification step comprising attempting to move each pipe 24 in axial translation after the connection of the pipe to the corresponding two connectors 26 and, if such movement in axial translation proves impossible, replacing the initial pipe with another pipe the first end 32 and the first abutment 38 of which are closer to each other than the first end and the first abutment of the initial pipe.

The method therefore makes it possible to prevent a pipe of larger size than the nominal pipe being used between each pair of consecutive connectors.

The verification step may be carried out after the assembly step, i.e. after the duct has been completely assembled.

Alternatively, the assembly and verification steps may be carried out conjointly. In this case, as soon as a pipe is connected to two consecutive connectors that have just been fixed to the structure, an operative attempts to move the pipe and if necessary proceeds to replace that pipe.

In accordance with a preferred embodiment of the assembly method, if the attempt to move the pipe in axial translation reveals that the pipe is liable to separate from one of the corresponding two connectors 26, the verification step further comprising replacing the initial pipe by another pipe the first end 32 and the first abutment 38 of which are farther apart than the first end and the first abutment of the initial pipe.

The method therefore makes it possible to prevent a pipe of too small a size being used between each pair of consecutive connectors of the duct.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft portion, comprising:
a structure, and
a duct configured to circulate a fluid and comprising a plurality of pipes and a plurality of connectors fixed to the structure and connecting the pipes two-by-two,
the plurality of pipes includes pipes of different lengths, each pipe having a first end situated on a first side of the duct and a second end, and
a first abutment situated on a second side of the duct,
each connector including a connector internal passage that fluidically connects two pipe internal passages respectively belonging to the two pipes that the connector connects to each other;
each connector including two cavities surrounding the connector internal passage and in which are respectively inserted respective ends of two consecutive pipes, namely a first cavity situated on the second side of the duct and a second cavity situated on the first side of the duct;
the first and second cavities of each connector having respective axes;
the first and second cavities of each connector being delimited internally by respective radially internal walls of annular shape respectively centered on the respective axes of the first and second cavities;
the first and second cavities of each connector being delimited externally by respective radially external walls also of annular shape and respectively centered on the respective axes of the first and second cavities;
each connector including an internal support delimiting the first and second cavities of the connector and connecting the respective radially internal walls of the first and second cavities to the respective radially external walls of the first and second cavities,
each pipe being movable in axial translation relative to the two connectors that the pipe connects to each other;
each connector including a second abutment that limits the travel in translation of the pipe received in the first cavity of the connector towards the first side of the duct by cooperating with the first end of the pipe and a third abutment that limits the travel in translation of the pipe received in the second cavity of the connector towards the second side of the duct by cooperating with the first abutment of the pipe;
wherein the plurality of connectors comprises at least a first connector and a second connector such that:
the respective internal supports of the first and second connectors have the same conformation;
the first cavity of the first connector and the second cavity of the second connector respectively receive the first and second ends of a first pipe of the plurality of pipes;
the first end and the first abutment of the first pipe are separated from each other by a first distance;
the internal support of the first connector and the third abutment that is part of the second connector are separated from each other by a second distance measured parallel to the respective axes of the first cavity of the first connector and the second cavity of the second connector;
the first connector and the second connector are positioned so that the plurality of pipes comprises a second pipe the first end and the first abutment of which are separated from each other by a third distance strictly greater than the first distance and strictly less than the second distance;
wherein the first connector includes a first obstacle arranged in the first cavity of this first connector, the first obstacle forming the second abutment of the first connector and being separated from the third abutment of the second connector by a fourth distance less than or equal to the third distance and measured parallel to the respective axes of the first cavity of the first connector and the second cavity of the second connector, and
wherein the second abutment of said second connector is formed by the internal support of the second connector or by a second obstacle arranged so that the relative position of the second obstacle and the internal support of the second connector is different from the relative position of the first obstacle and the internal support of the first connector.

2. The aircraft portion as claimed in claim 1, wherein any pipe of said duct, the first end and the first abutment of which are separated from each other by a fifth distance strictly greater than the first distance, is such that said fifth distance is greater than or equal to the fourth distance.

3. The aircraft portion as claimed in claim 1, wherein said first obstacle is perforated.

4. The aircraft portion as claimed in claim 1, wherein the internal support of each connector is perforated.

5. The aircraft portion as claimed in claim 1, wherein said first obstacle is spaced apart from the internal support of the first connector.

6. The aircraft portion as claimed in claim 1, said aircraft portion being a fuselage section or a set of fuselage sections.

7. The aircraft portion as claimed in claim 1, said aircraft portion being a wing or a rear tail assembly.

8. An aircraft including an aircraft portion comprising:
   a structure, and
      a duct configured to circulate a fluid and comprising a plurality of pipes and a plurality of connectors fixed to the structure and connecting the pipes two-by-two,
      the plurality of pipes includes pipes of different lengths, each pipe having a first end situated on a first side of the duct and a second end, and
      a first abutment situated on a second side of the duct,
      each connector including a connector internal passage that fluidically connects two pipe internal passages respectively belonging to the two pipes that the connector connects to each other;
      each connector including two cavities surrounding the connector internal passage and in which are respectively inserted respective ends of two consecutive pipes, namely a first cavity situated on the second side of the duct and a second cavity situated on the first side of the duct;
      the first and second cavities of each connector having respective axes;
      the first and second cavities of each connector being delimited internally by respective radially internal walls of annular shape respectively centered on the respective axes of the first and second cavities;
      the first and second cavities of each connector being delimited externally by respective radially external walls also of annular shape and respectively centered on the respective axes of the first and second cavities;
      each connector including an internal support delimiting the first and second cavities of the connector and connecting the respective radially internal walls of the first and second cavities to the respective radially external walls of the first and second cavities,
      each pipe being movable in axial translation relative to the two connectors that the pipe connects to each other;
      each connector including a second abutment that limits the travel in translation of the pipe received in the first cavity of the connector towards the first side of the duct by cooperating with the first end of the pipe and a third abutment that limits the travel in translation of the pipe received in the second cavity of the connector towards the second side of the duct by cooperating with the first abutment of the pipe;
      wherein the plurality of connectors comprises at least a first connector and a second connector such that:
      the respective internal supports of the first and second connectors have the same conformation;
      the first cavity of the first connector and the second cavity of the second connector respectively receive the first and second ends of a first pipe of the plurality of pipes;
      the first end and the first abutment of the first pipe are separated from each other by a first distance;
      the internal support of the first connector and the third abutment that is part of the second connector are separated from each other by a second distance measured parallel to the respective axes of the first cavity of the first connector and the second cavity of the second connector;
      the first connector and the second connector are positioned so that the plurality of pipes comprises a second pipe the first end and the first abutment of which are separated from each other by a third distance strictly greater than the first distance and strictly less than the second distance;
      wherein the first connector includes a first obstacle arranged in the first cavity of this first connector, the first obstacle forming the second abutment of the first connector and being separated from the third abutment of the second connector by a fourth distance less than or equal to the third distance and measured parallel to the respective axes of the first cavity of the first connector and the second cavity of the second connector, and
      wherein the second abutment of said second connector is formed by the internal support of the second connector or by a second obstacle arranged so that the relative position of the second obstacle and the internal support of the second connector is different from the relative position of the first obstacle and the internal support of the first connector.

9. A method for assembling an aircraft portion, the aircraft portion comprising:
   a structure, and
      a duct configured to circulate a fluid and comprising a plurality of pipes and a plurality of connectors fixed to the structure and connecting the pipes two-by-two,
      the plurality of pipes includes pipes of different lengths, each pipe having a first end situated on a first side of the duct and a second end, and
      a first abutment situated on a second side of the duct,
      each connector including a connector internal passage that fluidically connects two pipe internal passages respectively belonging to the two pipes that the connector connects to each other;
      each connector including two cavities surrounding the connector internal passage and in which are respectively inserted respective ends of two consecutive pipes, namely a first cavity situated on the second side of the duct and a second cavity situated on the first side of the duct;
      the first and second cavities of each connector having respective axes;
      the first and second cavities of each connector being delimited internally by respective radially internal walls of annular shape respectively centered on the respective axes of the first and second cavities;
      the first and second cavities of each connector being delimited externally by respective radially external walls also of annular shape and respectively centered on the respective axes of the first and second cavities;
      each connector including an internal support delimiting the first and second cavities of the connector and connecting the respective radially internal walls of the first and second cavities to the respective radially external walls of the first and second cavities,
      each pipe being movable in axial translation relative to the two connectors that the pipe connects to each other;
      each connector including a second abutment that limits the travel in translation of the pipe received in the first cavity of the connector towards the first side of the duct by cooperating with the first end of the pipe and a third abutment that limits the travel in translation of the pipe received in the second cavity of the connector towards the second side of the duct by cooperating with the first abutment of the pipe;

wherein the plurality of connectors comprises at least a first connector and a second connector such that:

the respective internal supports of the first and second connectors have the same conformation;

the first cavity of the first connector and the second cavity of the second connector respectively receive the first and second ends of a first pipe of the plurality of pipes;

the first end and the first abutment of the first pipe are separated from each other by a first distance;

the internal support of the first connector and the third abutment that is part of the second connector are separated from each other by a second distance measured parallel to the respective axes of the first cavity of the first connector and the second cavity of the second connector;

the first connector and the second connector are positioned so that the plurality of pipes comprises a second pipe the first end and the first abutment of which are separated from each other by a third distance strictly greater than the first distance and strictly less than the second distance;

wherein the first connector includes a first obstacle arranged in the first cavity of this first connector, the first obstacle forming the second abutment of the first connector and being separated from the third abutment of the second connector by a fourth distance less than or equal to the third distance and measured parallel to the respective axes of the first cavity of the first connector and the second cavity of the second connector, and wherein the second abutment of said second connector is formed by the internal support of the second connector or by a second obstacle arranged so that the relative position of the second obstacle and the internal support of the second connector is different from the relative position of the first obstacle and the internal support of the first connector, and the method comprising:

a step comprising procuring said plurality of pipes and said plurality of connectors;

an assembly step comprising fixing the connectors to the structure of the aircraft portion and connecting the connectors two-by-two by means of the pipes; and a verification step comprising attempting to move each pipe in axial translation after the connection of the pipe to the corresponding two connectors and, if such movement in axial translation proves impossible, replacing the initial pipe with another pipe the first end and the first abutment of which are closer to each other than the first end and the first abutment of the initial pipe.

10. The method as claimed in claim 9, wherein the verification step further comprises replacing the initial pipe by another pipe, the first end and the first abutment of which are farther apart from each other than the first end and the first abutment of the initial pipe if the movement in axial translation of the initial pipe enables this initial pipe to separate from one of the corresponding two connectors.

\* \* \* \* \*